United States Patent
Lewites et al.

(10) Patent No.: US 7,561,531 B2
(45) Date of Patent: Jul. 14, 2009

(54) APPARATUS AND METHOD HAVING A VIRTUAL BRIDGE TO ROUTE DATA FRAMES

(75) Inventors: Saul Lewites, Aloha, OR (US); Ajay Garg, Portland, OR (US)

(73) Assignee: Intel Corporation, Santa Clara, CA (US)

(*) Notice: Subject to any disclaimer, the term of this patent is extended or adjusted under 35 U.S.C. 154(b) by 822 days.

(21) Appl. No.: 11/109,842

(22) Filed: Apr. 19, 2005

(65) Prior Publication Data
US 2006/0233168 A1    Oct. 19, 2006

(51) Int. Cl.
*H04L 12/56* (2006.01)
(52) U.S. Cl. .................. 370/254; 370/392; 370/401
(58) Field of Classification Search ................ 370/389, 370/392, 395.31; 709/246, 249, 250
See application file for complete search history.

(56) References Cited

U.S. PATENT DOCUMENTS

| | | | |
|---|---|---|---|
| 6,727,386 B2 | 4/2004 | Hamrock | |
| 6,928,478 B1* | 8/2005 | Gangadharan | 709/226 |
| 7,103,035 B1* | 9/2006 | Kanuri | 370/356 |
| 7,120,701 B2 | 10/2006 | Warrier et al. | |
| 7,251,824 B2 | 7/2007 | Edwards et al. | |
| 7,293,108 B2 | 11/2007 | Warrier et al. | |
| 2002/0023210 A1* | 2/2002 | Tuomenoksa et al. | 713/161 |
| 2002/0092174 A1 | 7/2002 | Wexler | |
| 2003/0130832 A1* | 7/2003 | Schulter et al. | 703/23 |
| 2004/0032876 A1 | 2/2004 | Garg et al. | |
| 2004/0057380 A1* | 3/2004 | Biran et al. | 370/235 |
| 2005/0030956 A1 | 2/2005 | Lord et al. | |
| 2005/0125691 A1 | 6/2005 | Garg et al. | |
| 2005/0138620 A1 | 6/2005 | Lewites | |
| 2005/0182853 A1 | 8/2005 | Lewites et al. | |
| 2005/0183082 A1 | 8/2005 | Lewites et al. | |
| 2005/0204357 A1 | 9/2005 | Garg et al. | |
| 2005/0240758 A1 | 10/2005 | Lord et al. | |
| 2006/0075014 A1 | 4/2006 | Tharappel et al. | |
| 2006/0095591 A1 | 5/2006 | Kelly | |
| 2006/0156399 A1 | 7/2006 | Parmar et al. | |

OTHER PUBLICATIONS

*Technology@Intel Magazine*—Dec. 2004/Jan. 2005 Issue,32 pgs.
"Intel Vanderpool Technology for IA-32 Processors (VT-x)—Preliminary Specification", *Intel White Paper*, Preliminary Specification,(Jan. 2005),62 pgs.
"LaGrande Technology Architectural Overview", *Intel White Paper*, (Sep. 2003),10 pgs.
"LaGrande Technology Policy on Owner/User Choice and Control—Draft for Industry Comment", *Intel White Paper*, (Sep. 2003),4 pgs.
"Vanderpool Technology for the Intel Itanium Architecture (VT-i) Preliminary Specification—Revision 1.0", *Intel White Paper*, Document No. 305942-001,(Jan. 2005),96 pgs.

(Continued)

*Primary Examiner*—Gregory B Sefcheck
*Assistant Examiner*—Salvador E Rivas
(74) *Attorney, Agent, or Firm*—Christopher K. Gagne

(57) ABSTRACT

A method and apparatus establish an address of a frame as being associated with a physical device or a virtual device. If the frame is associated with a virtual device, the address of the frame may be established as being associated with a local virtual device or a remote virtual device. Establishing the nature and location of the device may provide routing by a virtual bridge.

28 Claims, 3 Drawing Sheets

OTHER PUBLICATIONS

Ferron-Jones, Mike, et al., "LaGrande Technology & Safer Computing Overview", *Intel Developer Forum*, http://www.securitytechnet.com/resource/rsc-center/presentation/intel/fall2003/F03USSCMS16_OS.pdf,(2003),19 pgs.

Grawrock, David, "LaGrande Architecture SCMS—18", *Intel Developer Forum*, (Sep. 2003),57 pgs.

Kozuch, Michael A., et al., "Enterprise Client Management with Internet Suspend/Resume", *Intel Technology Journal*, 8(4), (Nov. 17, 2004),1-14.

* cited by examiner

APPARATUS AND METHOD HAVING A VIRTUAL BRIDGE TO ROUTE DATA FRAMES

TECHNICAL FIELD

Embodiments of the invention relate generally to virtual electronic devices, in particular routing to electronic virtual devices.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the present invention. Other embodiments may be utilized and structural, logical, and electrical changes may be made without departing from the scope of the invention. The various embodiments disclosed herein are not necessarily mutually exclusive, as some disclosed embodiments can be combined with one or more other disclosed embodiments to form new embodiments. The following detailed description is, therefore, not to be taken in a limiting sense, and the scope of the embodiments of the present invention is defined only by the appended claims, along with the full scope of equivalents to which such claims are entitled.

Figure 1:
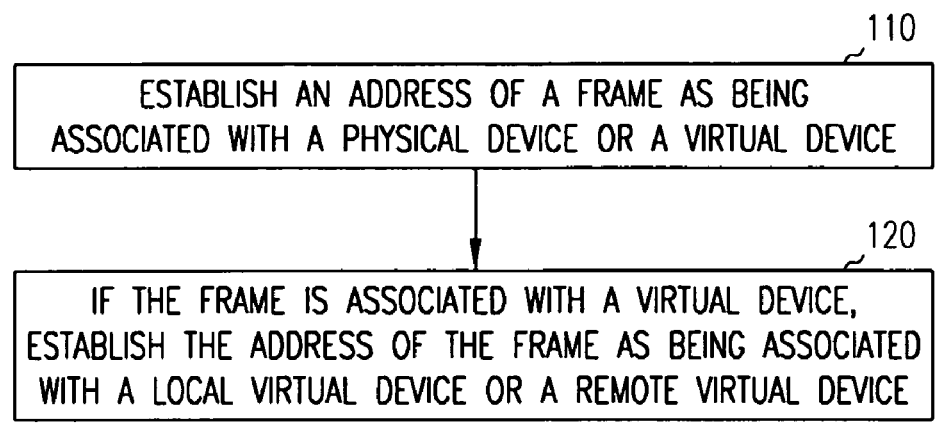
FIG. 1 shows features of an embodiment of a method to establish whether a frame belongs to a virtual device or to a real device to assist routing by a virtual bridge.

FIG. 1 depicts an embodiment of features of a method to provide routing by a virtual bridge. At 110, an address of a frame is established as being associated with a physical device or a virtual device. At 120, if the frame is associated with a virtual device, the address of the frame is established as being associated with a local virtual device or a remote virtual device. A local virtual device resides on the virtual platform associated with the virtual bridge and a remote virtual device resides on another virtual platform. In an embodiment, a method includes establishing an address of a frame as being associated with a virtual device by generating an address that identifies within the address that the address is associated with a virtual device. In an embodiment, a method includes assigning a portion of the address of the frame a value such that the value is different from those assigned to physical devices. In an embodiment, such a virtual device may be a virtual network interface. The virtual network interface may be realized as a virtual network interface card. In an embodiment, a method includes establishing an address of a frame as being associated with a physical device or a virtual device by checking information in an address for a frame that identifies within the address whether the frame is to be routed to a real device or a virtual device. In an embodiment, a method includes routing the frame based on checking information in an address to determine whether to route the frame to a specific local virtual device or a remote virtual device. In an embodiment, such a virtual device may be a virtual network interface card.

An embodiment provides an approach to create a scalable and high-performance virtual bridge in a virtualized platform. An apparatus having virtual machines (VMs) permits the apparatus, a real (physical) machine, to be partitioned, such that the underlying hardware of the apparatus appears as one or more independently operating physical machines. Each VM may function as a self-contained platform, running its own operating system (OS) and/or application software. Software executing within a VM is collectively referred to as guest software. A Virtual Machine Monitor (VMM) runs on an apparatus that executes instructions and presents to other software an abstraction of one or more VMs. The VMM may be in control of the platform. The VMs, running guest OSs, are isolated replicas of the hardware that are managed by the VMM. The VMM may provide a management application that allows the end user or administrator to set the number of VMs to launch and assign to a VM zero, one, or multiple virtual network interface cards (VNICs). Similar to real network interface cards, each VNIC has an address associated with it. The address may include a medium access control (MAC) address.

Figure 2:
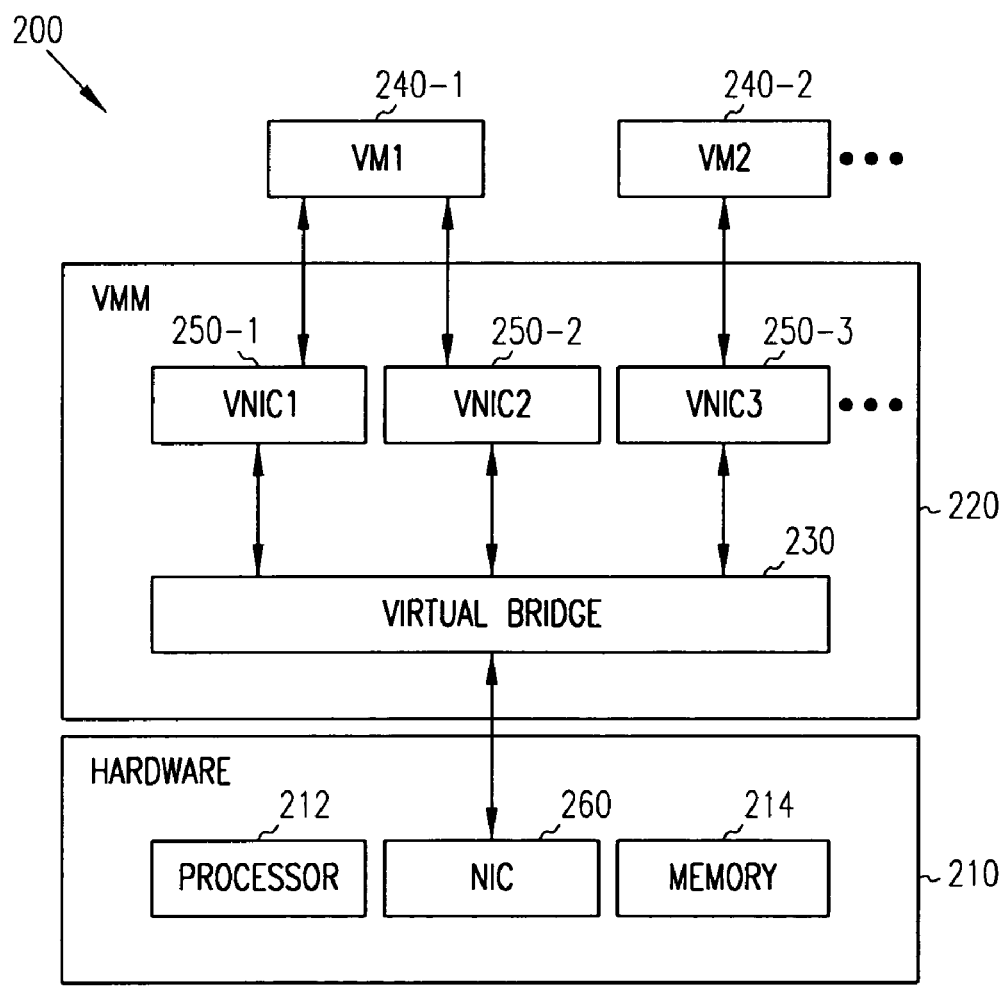
FIG. 2 shows a block diagram for an embodiment of an apparatus having hardware and a virtual machine monitor, where the virtual machine monitor includes a virtual bridge to route frames.

FIG. 2 depicts an embodiment of an apparatus 200 having hardware 210 and a virtual machine monitor 220, VMM 220, to control a virtualized platform. Hardware 210 may include a computing platform capable of executing an operating system (OS) and VMM 220. Hardware 210 may include one or more processors 212 and memories 214. Processor 212 can be any type of processor capable of executing software, such as a microprocessor, digital signal processor, microcontroller, or the like. The processor 212 may include microcode, macrocode, software, programmable logic or hard coded logic for performing the execution of various embodiments. Memory 214 can be a hard disk, a floppy disk, random access memory (RAM), read only memory (ROM), flash memory, any other type of machine medium readable by processor 212, or any other processing device in apparatus 200. Memory 214 may store instructions and/or data for performing the execution of various embodiments to provide routing by a virtual bridge 230. Hardware 210 may include a number of devices not shown in FIG. 2, such as input/output devices. Such other devices are omitted to focus on various embodiments. Hardware 210 may include a personal computer (PC), mainframe, handheld device, portable computer, set-top box, intelligent appliance, or any other computing device or system.

VMM 220 includes virtual bridge 230, which enforces the virtual network configuration set by a user. Routing complexity that may arise typically resides in virtual bridge 230, which is a component for multiplexing outbound traffic and demultiplexing inbound traffic. The multiplexer side is responsible for determining whether outgoing frames should be looped back to another virtual device within the system, sent out to the real network, or both. The demultiplexer side decides to which virtual device incoming frames should be routed. In general, a bridge incurs up to n times the complexity when making its MAC level routing decisions, where n is the number of MAC addresses stored in the bridge's memory. In various embodiments, means are provided for virtual bridge 230 to reduce its time complexity to the order associated with one MAC address.

In a non-limiting exemplary embodiment, FIG. 2 shows virtual machines 240-1, 240-2 under the control of VMM 220, where VMM 220 includes virtual network interface cards (VNICs) labeled VNIC1 250-1, VNIC2 250-2, VNIC3 250-3. As can be appreciated by those skilled in the art, apparatus 200 is not limited to two VMs, but may include any number of VMs. Further, VMM 220 is not limited to three VNICs, but may include any number of VNICs. Hardware 210 for VMM 220 includes a network interface card (NIC) 260, which is a physical (real) NIC. Each of the VNICs 250-1, 250-2, 250-3 is associated with NIC 260. Virtual machines 240-1, 240-2 and VNIC1 250-1, VNIC2 250-2, VNIC3 250-3 are local virtual devices associated with real NIC 260. Remote virtual machines and remote virtual NICs may be associated with another real network interface card.

A straight-forward approach for virtual bridge 230 to make its routing decisions is to store all VNIC MAC addresses in a list, either statically or dynamically allocated, and, for every outgoing/incoming frame, perform a sequential search through every VNIC of every VM. However, this scheme does not scale well as the number of VMs and/or VNICs per VM grows. In an embodiment, a unique scheme is provided to assign MAC addresses to the VNICs so that virtual bridge 230 may make a routing decision with a single access to a routing table. In an embodiment, a portion of an address of a frame is assigned a value such that the value is distinguished from those assigned to physical devices. In such a case, the value indicates that the address is for a virtual device such that no physical device is associated with the assigned value. To further identify a virtual device, creation or generation of the address may include assigning an index to another byte of the address, where the index belongs to a table that maintains pointers to virtual device objects. However, since virtual devices may be associated with different physical devices at various locations in a network or networks, the address of the given virtual device is assigned a number of bytes that are a part of the physical device to which the virtual device is associated.

In an embodiment, a 6-byte MAC address is created for a VNIC, where the first byte is set to a value that is different from the first byte of all the assigned Organizationally Unique Identifiers (OUIs). An OUI is a 24-bit globally unique assigned number referenced by various standards. The 24-bit structure for an OUI may change as variations in technology occur. By examining an OUI, a determination can be made as to the manufacturer of the physical NIC. In an embodiment, the first byte for the VNIC could be set to 0x0D, since it is reserved and no vendor OUI starts with this value. Because no vendor has a product OUI that starts with 0x0D, an address starting with 0x0D identifies a VNIC rather than a real NIC. By selecting a unique OUI prefix, collisions with real MAC addresses are eliminated. In an embodiment, depending on the standard used, the value that identifies the address as belonging to a virtual device may be located in another portion of the MAC address other than the first byte.

In an embodiment, the second byte may be an index of a table that maintains pointers to all VNIC objects. Depending on the standard, the index of the table may be located in another portion of the MAC address. The table effectively maps the MAC address to a data structure that contains VNIC specific information such as callback routines, DMA pointers, registers, etc. VNIC objects provide data structures to interface with the VMM. These VNIC objects may be data structures providing parameters that associate VNICs to VMs and are used by the VMM to route a packet to a VM.

Figure 3:
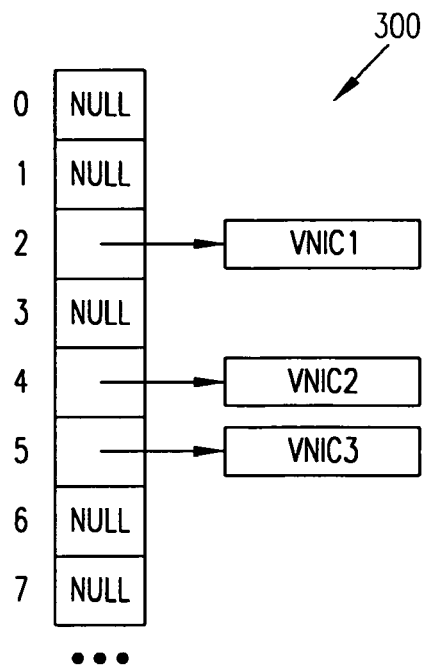
FIG. 3 shows an embodiment of a table used by a virtual bridge to route frames to virtual network interface cards.

FIG. 3 illustrates an embodiment of a table 300 associated with VNIC1 250-1, VNIC2 250-2, and VNIC3 250-3 of FIG. 2 managed by VMM 220, where these VNICs have respective indexes 2, 4, 5, embedded in their MAC addresses that point to data structures within the VMM to provide routing of a packet through the stack to a given VM through a given VNIC. This addressing scheme eliminates the possibility of collisions among the MAC addresses of the VNICs of the same system, since each address is guaranteed a unique table index.

The index may be randomly generated. In an embodiment, when an apparatus or a system is started or powered up, part of the VMM initialization may include creating VNIC objects. Generation of the VNIC objects may be managed by the VMM as part of the creation of VNICs including the assignment of a MAC address to each VNIC. At the beginning of the process, the table may be empty and as VNICs are created, an entry is assigned in the table. The manner in which the index is assigned may vary, as long as only one index is assigned to each VNIC. Thus, as the apparatus proceeds through the initialization process, a VNIC is created, a data structure for the VNIC is created, and a MAC address is generated for the VNIC with the MAC address including the index. Then, the process continues for each additional VNIC including providing a table index. The table index may be any index in the table as long as it is unique to the VNIC being created. In an embodiment, the indexes may be assigned sequentially as the VNICs are generated. There are no restrictions to assigning the index as long as the index assignments are unique.

In an embodiment, the last four bytes of the address of a VNIC are assigned the last four bytes of the address of the physical NIC that provides routing of frames to the VNIC from a location external to its VMM. The routing external to the VMM is exemplarily shown in FIG. 2 by the arrows from NIC 260 to virtual bridge 230. Depending on the standard, the assignment of address information tying the VNIC to its associated physical NIC may use more or less bytes and be located in another portion of the MAC address.

Figure 4:
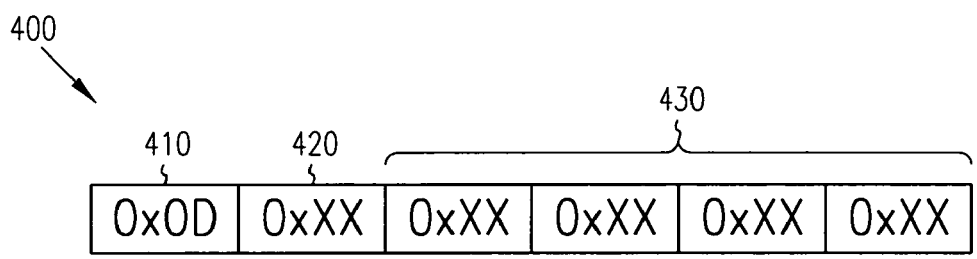
FIG. 4 illustrates an embodiment of a MAC address having a byte that indicates whether the address is associated with a virtual network interface card or a real network interface card.

FIG. 4 illustrates an embodiment of the components of a MAC address 400 of a VNIC, which may be generated by a VMM, for example, VMM 220 of FIG. 2. As shown in FIG. 4, MAC address includes a prefix byte 410 from a reserved pool, a table index 420 that is randomly generated, and real bytes 430 that are the lower four bytes of the real NIC's address. The length of the routing table index, for example table 300 of FIG. 3, and the remaining fields in the VNIC MAC address can be adjusted according to the maximum number of VNICs supported by an apparatus or system. For example, the MAC address format shown in FIG. 4 supports up to 256 virtual MAC addresses. Increasing the table index field length to two bytes (and reducing the real NIC's suffix to three) provides entries for up to 65000 VNICs.

In various embodiments of methods that provide a scheme for routing by a virtual bridge, a routing table may be used that embeds an index to the routing table in the VNIC's MAC address to preclude the need for a sequential search to route frames. A reserved prefix may be used in the MAC address to eliminate collisions with the MAC addresses of real NICs. Random values and a subset of a real NIC's MAC address may be used to minimize collisions among VNICs' MAC addresses. In various embodiments, MAC addresses are created for VNICs during apparatus boot up as part of the process of creating a VNIC and MAC addresses by the VMM. Then, VMs may interact with their associated VNICS including obtaining the MAC address of their associated VNICS. With a MAC address having a format in accordance with embodiments discussed herein, the virtual bridge may operate at enhanced speed.

Figure 5:
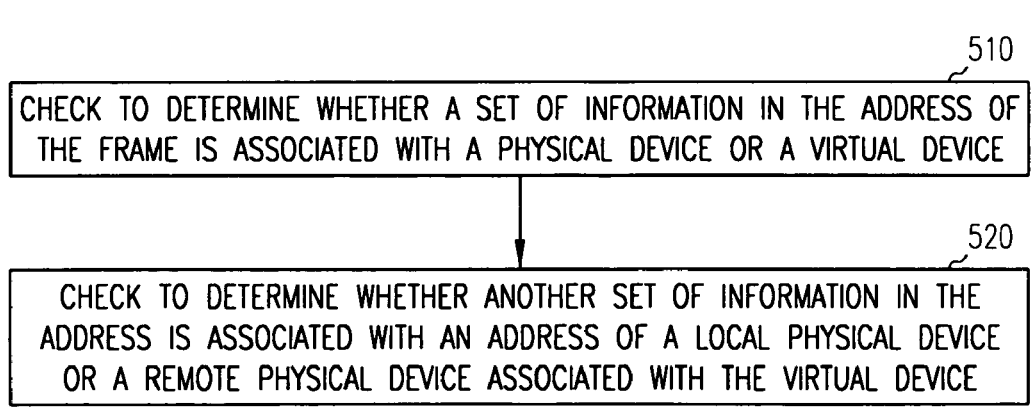
FIG. 5 shows features of an embodiment of method to route a frame to a virtual device.

Embodiments for a MAC address for a virtual device may be used by a virtual bridge, such as virtual bridge 230 of FIG. 2, to route frames to appropriate VMs. An embodiment of a method is shown in FIG. 5. At 510, a check is made to determine whether a set of information in the address of the frame is associated with a physical device or a virtual device. At 520, a check is made to determine whether another set of information in the address is associated with an address of a local physical device or a remote physical device associated with the virtual device. A routing table may be accessed at an index specified by a third set of information in the address. After accessing the routing table, the frame may be forwarded to the appropriate local virtual network interface card.

In an embodiment, when a frame reaches a virtual bridge, such as virtual bridge 230 of FIG. 2, the virtual bridge determines whether the destination MAC address is real or virtual by checking the first byte. If the destination is real, the frame is passed down to the physical NIC to be sent out to the external network (external to the physical NIC and the virtual bridge). If the destination NIC is virtual, the bridge further checks the last four bytes to determine if the VNIC is local or remote. If the destination is remote, the frame is also passed down to the physical NIC to be sent out to the external network. If the destination is local, a routing table is accessed at the index specified by the second byte of the MAC address. The virtual bridge may then forward the frame with respect to the appropriate VNIC according to the table entry. The remaining hand shaking with respect to sending information to a VM may be managed the VMM. In an embodiment, for a configuration in which each VNIC is associated with one VM, by checking the frame to select an appropriate VNIC, the virtual bridge makes a decision to route information to a particular VM by selecting the VNIC for routing. A VM may be operatively coupled to multiple VNICs.

Embodiments, such as those described herein, may increase the routing performance of the virtual bridge significantly by reducing routing time complexity from on the order of n to about the order 1 VNIC with a marginal increase in the memory. For example, a 1 KB table may be used to handle 256 VNICs. The virtual bridge may handle any number of VNICs with no change in the routing performance, providing scalability. Various embodiments may also provide elimination of collisions among MAC addresses of VNICs in the same virtual system, elimination of collisions among virtual MAC addresses and real MAC addresses, and reduced chance of collision among MAC addresses of VNICs that reside in different systems. Various embodiments providing such dynamic routing by a virtual bridge may enhance virtualization solutions for various applications.

Figure 6:
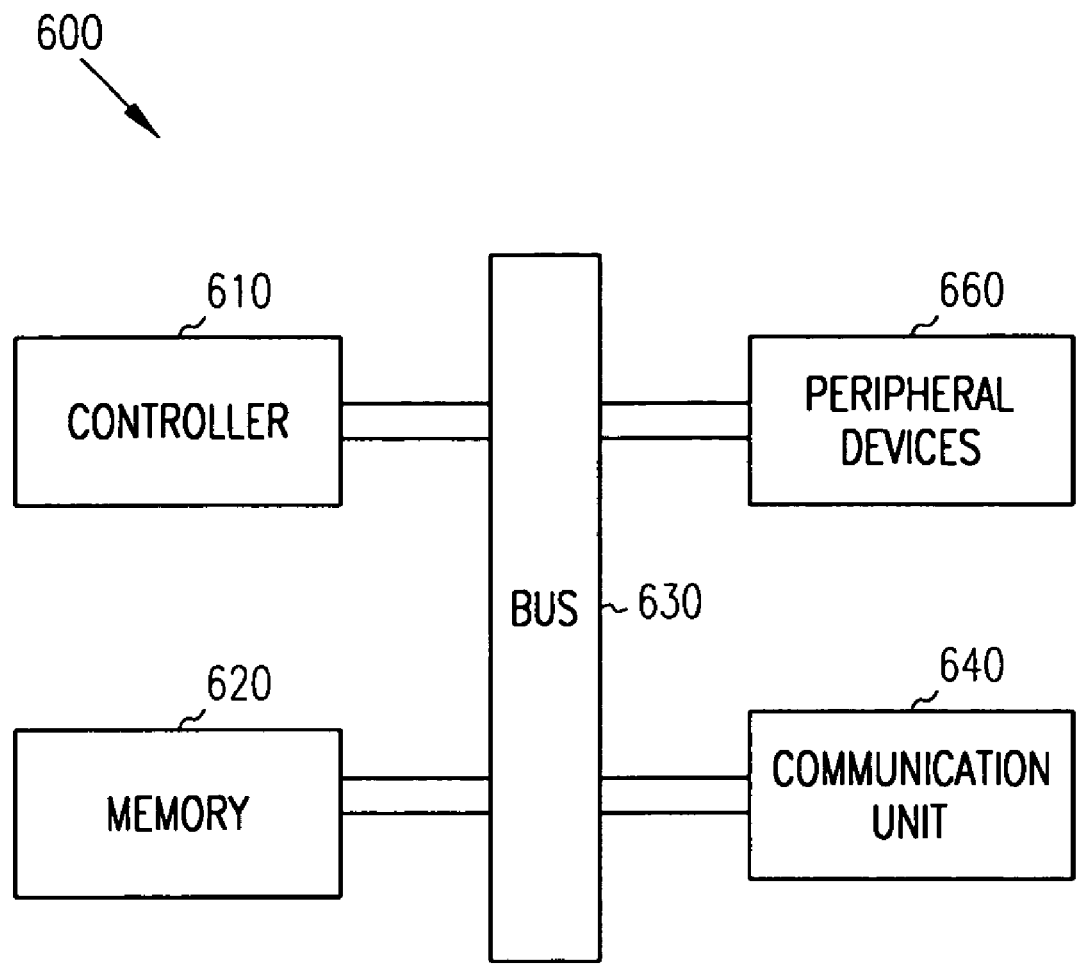
FIG. 6 illustrates a block diagram of an embodiment of a system that includes a virtualized platform in which a virtual machine monitor has a virtual bridge to route frames to and from virtual machines using an address having information that identifies the frame as being associated with a virtual device or a real device.

FIG. 6 illustrates a block diagram of an embodiment of a system 600 that includes a virtualized platform in which a virtual machine monitor, realized in various embodiments including that shown in FIG. 2, has a virtual bridge to route frames to and from virtual machines using an address having information that identifies the frame as being associated with a virtual device rather than a real device. System 600 includes a controller 610, a memory 620, and a bus 630, where bus 630 provides electrical connectivity between controller 610 and memory 620. Bus 630 may be a parallel bus. Alternatively, system 600 may include controller 610 coupled to memory 620 via a serial bus to execute instructions for a virtualized platform. In an embodiment, controller 610 is a processor, such as processor 212 of FIG. 2. Memory 620 may include any form of computer-readable medium that has computer executable instructions to establish an address of a frame as being associated with a physical device or a virtual device, and, if the frame is associated with a virtual device, to establish the address of the frame as being associated with a local virtual device or a remote virtual device, to provide routing by a virtual bridge.

An embodiment may include an additional peripheral device or devices 660 coupled to bus 630. Bus 630 may be compatible with PCI or with PCI express. Peripheral devices 660 may also include displays, additional storage memory, or other control devices that may operate in conjunction with controller 610. Alternatively, peripheral devices 660 may include displays, additional storage memory, or other control devices that may operate in conjunction with controller 610 and/or memory 620.

System 600 may include a communication unit 640 coupled to controller 610 via parallel bus 630. In an embodiment, communication unit 640 may include a network interface. In an embodiment, the network interface may be implemented in a semiconductor device (i.e., a "chip"). Alternatively, in various embodiments, the network interface may be integrated in separate semiconductor devices forming part of a family of chips called a "chip set." A chip set may be realized as a group of microchips designed to work and to be sold as a unit in performing one or more related functions. In an embodiment, communication unit 640 may include a network interface implemented as a network interface card, such as NIC 260 of FIG. 2. Communication unit 640 may provide a means for a VM of system 600 to communicate and interact with a VM of another system, in which virtual bridges in these systems may route information using various embodiments according to the teachings described herein. Each VM of system 600 may be associated with one or more virtual network interfaces. Such systems may be on a local area network or wide area network. In addition, VMs on different systems may be configured as part of a network virtualization. Using embodiments for generating MAC addresses and checking MAC addresses, information may be routed through a network from one system to another system using standard routing protocols. System 600 may include, but is not limited to, information handling devices, wireless systems, telecommunication systems, fiber optic systems, electro-optic systems, and computers, where each system may operate a virtualized platform.

Various embodiments for methods and apparatus allow for increased speed of operation to make a routing decision using a virtual bridge. In an embodiment, information in an address may be used to distinguish between a real device and a virtual device. Other information in the address may be used to index directly into a table to distinguish between different virtual devices on the same virtual platform. Other information may be used to associate the virtual device with a given real device, which indicates whether the virtual device is local or remote to the apparatus or system having the virtual platform.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon reviewing and studying the above description. The scope of embodiments of the present invention includes any other applications in which embodiments of the above structures and fabrication methods are used. The scope of the embodiments of the present invention should be determined with reference to the appended claims, along with the full scope of equivalents to which such claims are entitled.

What is claimed is:

1. A method comprising:
executing a virtual machine monitor by a controller, wherein the execution of the virtual machine monitor results in the operations of:
establishing an address of a frame as being associated with a physical device or a virtual device, the establishing including checking four bytes of a destination MAC address to determine if the four bytes are associated with a local or remote physical network interface card; and
if the frame is associated with the virtual device, establishing the address of the frame as being associated with a local virtual device relative to a virtual bridge or a remote virtual device, to provide routing by the virtual bridge.

2. The method of claim 1, wherein establishing an address of a frame as being associated with a physical device or a virtual device includes assigning a portion of the address of the frame a value such that the value is different from values assigned to physical devices.

3. The method of claim 2, wherein the value is assigned to the first byte of a MAC address of a virtual network interface card, the value of the first byte being different from a value of a first byte of assigned organizationally unique identifiers.

4. The method of claim 3, wherein the method includes:
assigning an index to a second byte of the MAC address, the index belonging to a table that maintains pointers to virtual network interface card objects; and
assigning four bytes of an address of a physical network interface card to four bytes of the MAC address, the physical network interface card being associated with the virtual network interface card.

5. The method of claim 1, wherein establishing an address of a frame as being associated with a physical device or a virtual device includes checking whether a first set of information in the address of the frame is associated with a physical device or a virtual device, and establishing the address of a frame as being associated with a local virtual device or a remote virtual device includes checking whether a second set of information in the address is associated with an address of a local physical or a remote physical device.

6. The method of claim 1, wherein establishing an address of a frame as being associated with a physical device or a virtual device includes checking a first byte of the destination MAC address to determine if the first byte is assigned to a physical network interface card.

7. The method of claim 6, wherein checking a first byte of the destination MAC address includes comparing the first byte against assigned identifiers.

8. The method of claim 1, wherein the method includes accessing a routing table at an index specified by a second byte of the destination MAC address.

9. The method of claim 8, wherein the method includes forwarding the frame to an appropriate local virtual network interface card after accessing the routing table.

10. The method of claim 1, wherein the method includes sending the frame to a physical network interface card if the checking the four bytes of the destination MAC address determines that the address of the frame is associated with a remote virtual network interface card.

11. An apparatus comprising:
a controller; and
virtual machine monitor executable by the controller, the virtual machine monitor operable to direct data flow between a network interface card and a set of virtual machines, the virtual machine monitor having a virtual bridge to make routing decisions, the virtual machine monitor operable to:
establish an address of a frame as being associated with a physical device or a virtual device by checking four bytes of a destination MAC address to determine if the four bytes are associated with a local or remote physical network interface card; and
if the frame is associated with the virtual device, establish the address of the frame as being associated with a local virtual device relative to a virtual bridge or a remote virtual device, to provide routing by the virtual bridge.

12. The apparatus of claim 11, wherein to establish an address of a frame as being associated with a physical device or a virtual device includes checking whether a first set of information in the address of the frame is associated with the physical device or a virtual device, and to establish the address of a frame as being associated with a local virtual device or a remote virtual device includes checking whether a second set of information in the address is associated with an address of a local physical device or a remote physical device.

13. The apparatus of claim 11, wherein to establish an address of a frame as being associated with the physical device or a virtual device includes checking a first byte of the destination MAC address to determine if the first byte is assigned to a physical network interface card.

14. The apparatus of claim 11, wherein the virtual bridge is operable to access a routing table at an index specified by a second byte of the destination MAC address and to forward the frame to an appropriate local virtual network interface card after accessing the routing table.

15. The apparatus of claim 11, wherein the virtual bridge is operable to send the frame to the physical network interface card if the checking the four bytes of the destination MAC address determines that the address of the frame is associated with a remote virtual network interface card.

16. The apparatus of claim 11, wherein the virtual machine monitor operable to establish an address of a frame as being associated with a physical device or a virtual device includes the virtual machine monitor operable to assign a portion of the address of the frame a value such that the value is different from another value assigned to a physical device.

17. The apparatus of claim 16, wherein the value is assigned to the first byte of a MAC address of a virtual network interface card, the value of the first byte being different from a value of a first byte of assigned organizationally unique identifiers.

18. The apparatus of claim 17, wherein the virtual machine monitor is operable to:
assign an index to a second byte of the MAC address, the index belonging to a table that maintains pointers to virtual network interface card objects; and
assign four bytes of an address of a physical network interface card to four bytes of the MAC address, the physical network interface card being associated with the virtual network interface card.

19. A computer readable medium that stores instructions, which when performed by a machine, cause the machine to:
establish an address of a frame as being associated with a physical device or a virtual device by checking four bytes of the destination MAC address to determine if the four bytes are associated with the local or remote physical network interface card; and if the frame is associated with a virtual device, establish the address of the frame as being associated with a local virtual device relative to a virtual bridge or a remote virtual device, to provide routing by the virtual bridge.

20. The computer readable medium of claim 19, wherein to establish an address of a frame as being associated with a physical device or a virtual device includes assigning a value to a first byte of a MAC address of a virtual network interface card, the value of the first byte being different than a value of a first byte of assigned organizationally unique identifiers of physical virtual network interface cards.

21. The computer readable medium of claim 20, wherein the instructions, which when performed by a machine, cause the machine to:

assign an index to a second byte of the MAC address, the index belonging to a table that maintains pointers to virtual network interface card objects; and assign four bytes of an address of a physical network interface card to four bytes of the MAC address, the physical network interface card being associated with the virtual network interface card.

22. The computer readable medium of claim 19, wherein to establish an address of a frame as being associated with a physical device or a virtual device includes checking a first byte of the destination MAC address to determine if the first byte has a value different than assigned to physical network interface cards.

23. The computer readable medium of claim 22, wherein the instructions, which when performed by a machine, cause the machine to:

access a routing table at an index specified by a second byte of the destination MAC address; and forward the frame to an appropriate local virtual network interface card after accessing the routing table.

24. A system comprising:

a processor;

a network interface;

a parallel bus to which the processor and the network interface are communicatively coupled; and a virtual machine monitor executable by the processor, the virtual machine monitor operable to direct data flow between the network interface and a set of virtual devices, the virtual machine monitor having a virtual bridge to make routing decisions, the virtual machine monitor operable to:

establish an address of a frame as being associated with a physical device or a virtual device by checking four bytes of a destination MAC address to determine if the four bytes are associated with a local or remote physical network interface card; and if the frame is associated with a virtual device, establish the address of the frame as being associated with a local virtual device or a remote virtual device, to provide routing by a virtual bridge.

25. The system of claim 24, wherein to establish an address of a frame as being associated with a physical device or a virtual device includes assigning a value to a first byte of a MAC address of a virtual network interface, the value of the first byte being different than a value of a first byte of assigned organizationally unique identifiers of physical network interfaces.

26. The system of claim 25, wherein the virtual machine monitor is operable to:

assign an index to a second byte of the MAC address, the index belonging to a table that maintains pointers to virtual network interface objects; and assign four bytes of an address of a physical network interface to four bytes of the MAC address, the physical network interface being associated with the virtual network interface.

27. The system of claim 24, wherein the virtual bridge is operable to:

check a first byte of the destination MAC address to determine if the first byte has a value different than assigned to physical network interfaces.

28. The system of claim 27, wherein the virtual bridge is operable to:

access a routing table at an index specified by a second byte of the destination MAC address; and forward the frame to an appropriate local virtual network interface after accessing the routing table.

* * * * *

UNITED STATES PATENT AND TRADEMARK OFFICE
CERTIFICATE OF CORRECTION

| | |
|---|---|
| PATENT NO. | : 7,561,531 B2 |
| APPLICATION NO. | : 11/109842 |
| DATED | : July 14, 2009 |
| INVENTOR(S) | : Saul Lewites et al. |

It is certified that error appears in the above-identified patent and that said Letters Patent is hereby corrected as shown below:

In column 7, line 36, in Claim 4, delete "a" and insert -- the --, therefor.

In column 7, line 52, in Claim 6, delete "a" and insert -- the --, therefor.

In column 8, line 3, in Claim 11, before "virtual" insert -- a --.

In column 8, line 28, in Claim 13, delete "the" and insert -- a --, therefor.

In column 8, line 31, in Claim 13, delete "a" and insert -- the --, therefor.

In column 8, line 56, in Claim 18, delete "address," and insert -- address of the virtual network interface card, --, therefor.

In column 8, line 59, in Claim 18, delete "a" and insert -- the --, therefor.

In column 8, line 60, in Claim 18, delete "address," and insert -- address of the virtual network interface card, --, therefor.

In column 9, line 19, in Claim 21, delete "address," and insert -- address of the virtual network interface card, --, therefor.

In column 9, line 23, in Claim 21, delete "address," and insert -- address of the virtual network interface card, --, therefor.

In column 10, line 26, in Claim 26, delete "address," and insert -- address of the virtual network interface, --, therefor.

UNITED STATES PATENT AND TRADEMARK OFFICE
CERTIFICATE OF CORRECTION

PATENT NO.        : 7,561,531 B2
APPLICATION NO.  : 11/109842
DATED             : July 14, 2009
INVENTOR(S)       : Saul Lewites et al.

It is certified that error appears in the above-identified patent and that said Letters Patent is hereby corrected as shown below:

In column 10, line 30, in Claim 26, delete "address," and insert -- address of the virtual network interface, --, therefor.

Signed and Sealed this

Twenty-ninth Day of September, 2009

David J. Kappos
*Director of the United States Patent and Trademark Office*